United States Patent [19]
Holtey

[11] Patent Number: 5,491,827
[45] Date of Patent: Feb. 13, 1996

[54] SECURE APPLICATION CARD FOR SHARING APPLICATION DATA AND PROCEDURES AMONG A PLURALITY OF MICROPROCESSORS

[75] Inventor: Thomas O. Holtey, Newton, Mass.

[73] Assignee: Bull HN Information Systems Inc., Billerica, Mass.

[21] Appl. No.: 181,684

[22] Filed: Jan. 14, 1994

[51] Int. Cl.$^6$ ................................................... G06F 15/20
[52] U.S. Cl. ........................ 395/800; 364/244.6; 364/243; 364/249; 364/DIG. 1
[58] Field of Search ............................. 395/800; 235/380, 235/492

[56] References Cited

U.S. PATENT DOCUMENTS

| | | | |
|---|---|---|---|
| 4,748,320 | 5/1988 | Yorimoto | 235/492 |
| 4,829,169 | 5/1989 | Watanabe | 235/492 |
| 5,206,938 | 4/1993 | Fujioka | 395/400 |
| 5,263,147 | 11/1993 | Francisco | 395/425 |

Primary Examiner—Eric Coleman
Attorney, Agent, or Firm—Faith F. Driscoll; John S. Solakian

[57] ABSTRACT

An application memory card system includes a secure memory card which can be operatively connected to communicate with a host mainframe microprocessor or hand held device host microprocessor via a standard interface. The secure memory card contains an application processor and an access control microprocessor (ACP), each of which connect through an internal bus to a number of non-volatile addressable memory chips, each organized into a plurality of blocks. Each microprocessor has an additional control signal line included in a control bus portion of its bus for specifying "Execute" access. An access discrimination logic unit which connects to the internal bus and to the non-volatile memory includes an access by type memory writable by the application processor under the control of the ACP for maintaining security. The access discrimination logic unit combines the "Execute" control access signal from a microprocessor with a signal designating the microprocessor source (e.g. external or internal) to define the type of memory access requested and transfers a control enabling signal as a function of the state of the selected stored access control bit indicating if the requested access is allowed to the addressed block.

19 Claims, 4 Drawing Sheets

SECURE APPLICATION CARD FOR SHARING APPLICATION DATA AND PROCEDURES AMONG A PLURALITY OF MICROPROCESSORS

RELATED APPLICATIONS

1. The patent application of Thomas O. Holtey and Peter J. Wilson entitled, "Secure Memory Card," filed on Oct. 14, 1992, bearing Ser. No. 07/960,748, which issued as U.S. Pat. No. 5,293,424 on Mar. 8, 1994 and which is assigned to the same assignee as this patent application.

2. The patent application of Thomas O. Holtey entitled, "A Secure Memory Card with Programmed Controlled Security Access Control," filed on Jan. 14, 1994, bearing Ser. No. 08/181,691, which is assigned to the same assignee as this patent application.

BACKGROUND OF THE INVENTION

1. Field of the Invention

This invention relates to the filed of portable personal computers and more particularly to systems for maintaining data security in a portable digital information environment.

2. Prior Art

The security of personal information has always been concern. Historically, it has been safeguarded through the use of signatures, credentials and photographs. Electronic devices such as automatic banking machines have added encoded cards and personal identification numbers (PINs) to the repertoire of security tools. Computers continue to use passwords.

More recently, the "Smart Card" has been used as a security tool. The "Smart Card" is a small microcomputer with writable, non-volatile memory and a simple input/output interface, fabricated as a single chip and embedded in a plastic "credit card". It has exterior pins to allow it be connected to specially designed equipment. The program contained in the card's microcomputer interacts with this equipment and allows its non-volatile memory data to be read or modified according to a desired algorithm which may optionally include a password exchange. Special techniques have been implemented to protect the memory data and to allow permission variations according to the situation. For example, U.S. Pat. No 4,382,279 entitled, "Single Chip Microprocessor with On-Chip Modifiable Memory" discloses an architecture which permits automatic programming of a non-volatile memory which is included on the same chip as a processing and control unit. As in other systems, the microprocessor only protects memory on the same chip.

The "Smart Card" has been used both to facilitate the process of identification and to be the actual site of the valued information. In this situation, as in most prior situations, physical presence of a "key" as well as some special knowledge has been used as part of the verification or authentication process. In such cases, identification has involved a dialog between the person desiring access and a fixed agent such as a security guard and an automatic teller machine.

The current state of portability of free standing computing devices makes it possible for both the physical key and the authentication agent to be small, portable and hence more subject to loss or theft. Further, computing devices make it possible to perform repeated attempts to guess or deduce the special knowledge or passwords associated with the identification process. This is especially true if the authentication agent or device is also under the control of the thief. To make matters worse, technology now allows and encourages the carrying of enormous amounts of sensitive information on one's person where it is subject to mishap.

Also, today's notebook and subnotebook sized computers provide a free standing environment having significant computing power which has created a need for additional data storage capability. This need has initially been met by miniature hard disk devices which can hold both programs and data. While password protection is often used in these systems, it does not completely protect sensitive data because, first, the authentication agent is vulnerable. But, more significantly, the disk device containing the data can be physically removed and accessed in a setting more conducive to analysis. In this case, data has been protected by employing some form of encryption. The nature of disk access makes this possible without encountering undue cost or performance barriers. An example of this type of system is described in U.S. Pat. No. 4,985,920 entitled "Integrated Circuit Card".

The recent emergence of the flash memory and removable "memory cards" have allowed major reductions in size and power requirements of the portable of the portable computer. The flash memory combines the flexibility of random access memories (RAMs) with the permanence of disks. Today, the combining of these technologies allows up to 20 million bytes of data to be stored without power, in a credit card size removable package. This data can be made to appear to a host system either as if it were stored on a conventional disk drive or if it were stored in an extension of the host system's memory.

These technological developments have made further reductions in system size possible to the extent that the system and data including programs can be carried on one's person. This has made the data, programs and its host system more vulnerable to loss or theft and also more difficult to protect memory data by encryption since this presents major cost and performance barriers.

Accordingly, it is a primary object of the present invention to provide a portable digital system with a secure memory subsystem.

It is a further object of the present invention to provide a memory card whose contents can be protected if removed from a portable digital system.

It is a more specific object of the present invention to provide a secure memory subsystem which can be used to protect the complete operating environment required in running an application.

SUMMARY OF THE INVENTION

The above and other objects of the present invention are achieved in the preferred embodiment of a secure application card which is operated in conjunction with one of more host systems such as the host system microprocessor described in the above reference related patent application to Thomas 0. Holtey, et al. The present invention extends the security for data to programs thereby providing a secure operating environment for running applications. The secure application card of the preferred embodiment includes an access control microprocessor (ACP) on a single semiconductor chip and one or more non-volatile addressable memory chips which serve as main memory. The access control microprocessor chip and non-volatile memory chips connect in common to an internal bus having different portions for transmitting address, data and control information to such non-volatile memory chips. The access control microprocessor includes an addressable non-volatile memory for storing configuration information including a number of key values and program instruction information for controlling the transfer of address, data and control information on the internal bus. In the preferred embodiment, a portion of the configuration information serves as the content for the access by type memory which is loaded at power-up. This data is protected by the ACP and can be modified via the host processor only with proper permissions (ala changing passwords).

According to the teachings of the present invention, the secure application card further includes an application microprocessor which also connects to the internal bus. In the preferred embodiment, the application processor as well as each of the other microprocessors which operatively connect to the card has an additional signal line included in the control portion of its bus interface carried through to the control portion of the internal bus which is used for indicating "Execute" access to memory as contrasted to simple read access. Associated with the application processor is an access discrimination logic unit included on the same chip as the access control microprocessor which controls access to the non-volatile memory chips. The access discrimination logic unit includes an access by type random access memory (RAM) having a plurality of word locations, each location associated with a different block of the addressable memory chips and having a number of access control bits coded for defining different types of access as a function of the specific application being run.

Selector means within the access by type memory connects to the control portion of the internal bus and in response to signals applied to the "Execute" signal line and an "off board" signal line for designating whether the microprocessor source is located outside the application card (e.g. host microprocessor) or within the card. The selector means selects the bit location corresponding to the type of access requested and uses the bit contents of the designated access bit location to allow or disallow the transfer of an enabling control signal to the non-volatile memory chips. In the preferred embodiment, the states of the "Execute" and "Off Board" signal lines define several different types of memory access. These are: Data Read Access from the host microprocessor, Data Read access from the application card's microprocessor, Execute Access from the host microprocessor, and Execute Access from the application card's microprocessor.

The access control microprocessor writes the contents of the access by type RAM in a conventional manner during power-up. As indicated, the host or application processor is allowed to modify the contents of this RAM only under the control of the ACP thereby maintaining security.

In the preferred embodiment, each host microprocessor couples to the application card through a standard interface such as one of the interfaces which conforms to the Personal Computer Memory Card International Association (PCMCIA) standards. More specifically, the particular PCMCIA interface selected is one which has the so-called "Execute-in-Place" (XIP) functionality which can be used in conjunction with card processors which provide bus mastering and intercard communications capabilities.

The present invention expands the capabilities of the secure memory card of the related patent applications by providing security for programs thereby enabling application software to be packaged along with its required microprocessor in a self contained card that responds to cooperating/host microprocessor(s) over the standard shared bus by the use of well defined messages or protocols but shields its internal operation from such microprocessor(s). This mode of operation conforms to the basic principal of object oriented software design whose goals are to provided a superior development environment by such segmentation of functions. Thus, the present invention achieves the same goals relative to providing a secure operating environment for applications.

As in the case of the related patent application, the present invention melds the "Smart Cart" and "memory card" technologies which is key to allowing the protection of large amounts of data made possible by flash memory technology in the "security harsh" environments created by electronic miniaturization. Also, the present invention also retains the features of the secure card of the related patent application relative to being capable of operating in secure and non-secure modes, eliminating the need for encrypting and decrypting data, and protecting memory contents if the card or its host processor is lost, stolen, powered off or left unattended. In the event of theft, the memory contents is protected from access even if the memory card is opened and probed electronically or the memory chips are removed and placed in another device.

The above objects and advantages of the present invention will be better understood from the following description when taken in conjunction with the accompanying drawings.

DESCRIPTION OF THE PREFERRED EMBODIMENT

Figure 1:
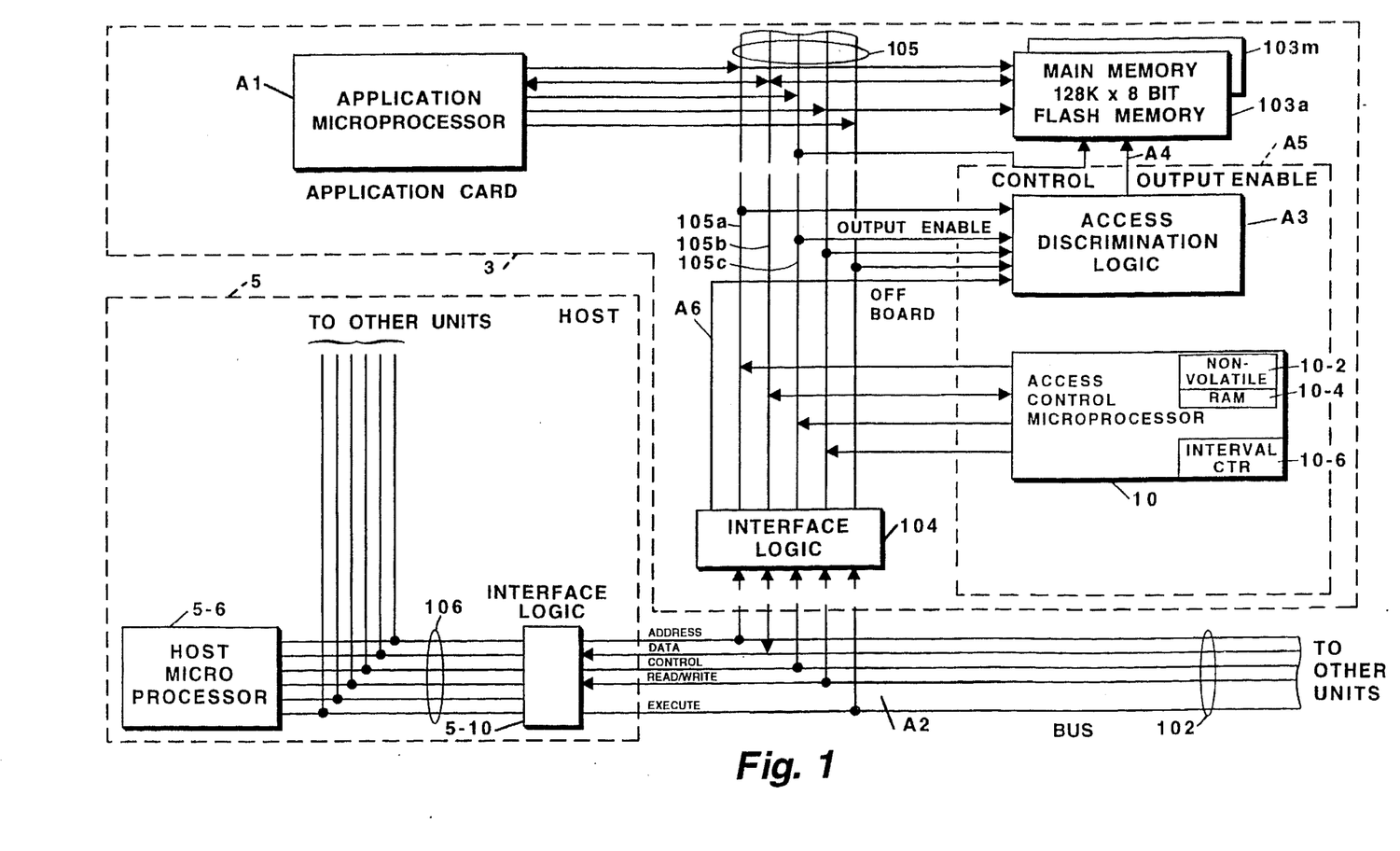
FIG. 1 is a block diagram of a system which incorporates an application card constructed according to the present invention.

FIG. 1 is a block diagram of a secure portable hand-held computing system usable as a personal computer or as a transaction processor. System 1 includes an application card 3 constructed according to the present invention which connects to a host processor 5 by an external bus 102. The host processor 5 may take the form of a palm top personal computer, such as the HP 95LX manufactured by Hewlett-Packard Company. The host processor 5 includes a microprocessor 5–6 which connects to bus 102 via an internal bus 106 and the interface logic circuits of block 5–10. The host processor 5 also may include other units which connect to internal bus 106 such as a liquid crystal display (LCD) 5–2, a keyboard 5–4, and a memory. The memory includes a one megabyte read only memory (ROM) and a 512 kilobyte random access memory The connection between the application card 3 and host microprocessor 5 is established through a standard bus interface. In the preferred embodiment, the bus 102 conforms to the Personal Computer Memory Card International Association (PCMCIA) standard which includes an "Execute-in-Place" (XIP) capability. The interface 102 provides a path for transferring address, control and data information between host processor 5 and the application card system 3 via a standard interface chip 104 and an internal bus 105. Each of the buses 102, 105, and 106 include a data bus, a control bus and an address bus and provide continuous signal paths through all like buses. For example, bus 105 includes address bus 105a, data bus 105b, and control bus 105c.

As shown, in FIG. 1, the application card 3 of the present invention includes an access control microprocessor (ACP) 10 which couples to bus 105, a plurality of CMOS flash memory chips designated as 103a through 103n which couple to internal bus 105, an application microprocessor A1 which couples to bus 105 and an access discrimination logic unit A3 which couples to bus 105 and to flash memories 103a through 103n as shown. ACP 10 is typically the same type of processing element as is used in the "Smart Card". The CMOS flash memories 103a through 103n may take the form of flash memory chips manufactured by Intel Corporation. For example, they may take the form of the Intel flash memory chips designated as Intel 28F001BX 1M which includes eight 128Kilobyte×8-bit CMOS flash memories. Thus, a 4 Megabyte flash memory card could include 32 such flash memories (i.e. n=32).

The access control microprocessor 10 and flash memories 103a through 103n can be constructed as disclosed in the above referenced related patent applications. For the sake of completeness, both ACP 10 and non-volatile memory 103i will be briefly described herein.

According to the present invention, as seen from FIG. 1, the control portion of internal bus 105 as well as external bus 102, contains a plurality of control signal lines which apply Execute, Read and Write control signals generated by any one of the microprocessors 5–6, 10 or A1. More specifically, each of the microprocessors include means for initiating Execute, Read and Write cycles of operation. through the different states of various control lines. For example, the microprocessors may be constructed in a manner similar to Intel 486 DX microprocessors relative to including the capability of initiating code read, memory read and memory write bus cycles of operation by altering the states of specific control lines. For more information concerning such bus cycles, reference may be made to the publication entitled "Microprocessors Vol. I", Reference No. CG-110392 by Intel Corporation.

The access discrimination logic unit A3 as discussed in greater detail in connection with FIG. 3 includes an Access by Type Random Access Memory (RAM) array containing a plurality of word locations, one location for each block of the memory chips 103a through 103n and input selector circuits connected to the "Execute" and "Off Board" control signal lines indicating the nature and source of the memory access. In accordance with the present invention, these signals define four different types of memory access, These are: Data Read Access from Host Microprocessor 5–6, Data Read Access from the Application Microprocessor A1, Execute Access from the Host Microprocessor 5–6, and Execute Access from the Application Microprocessor A1. The Access Discrimination Logic Unit A3 performs the task of applying the output enable control to the memory chips 103a through 103n. That is, it determines which type of enable control signal is to be applied to the memory chips 103a through 103n as a function of the state of the selected prestored access control bits of the location associated with the block being addressed.

ACCESS CONTROL MICROPROCESSOR 10

The access control microprocessor (ACP) 10 of the preferred embodiment, includes a protected non-volatile memory 10-2, a random access memory (RAM) 10-4, and an interval counter 10-6, all of which are diagrammatically represented in FIG. 1. The non-volatile memory 10-2 dedicates a number of addressed locations in which to store authentication information and programs. More specifically, a group of memory locations store one or more personal identification numbers (PINs), protocol sequences or other identification information for verifying that the user has access to the system, and configuration information for identifying the blocks in flash memories 103a through 103n that the user may access in addition to a time interval value used for reauthentication. Additionally, another group of memory locations store information for a given application which is loadable into the access discrimination logic RAM for designating the type of accesses (i.e., is a map or image of the access by type RAM contents).

Another group of memory locations store the key values used for protecting each of the flash memories 103a through 103n or the codes used to protect the individual blocks of each of the flash memories 103a through 103n. A further group of memory locations store the program instruction sequences for performing the required authentication operations and for clearing the system if the preset conditions for failure are met. For certain applications, program instructions can be included to enable the user to control the setting of the interval counter 10-6 which establishes when user reauthentication takes place.

FLASH MEMORIES 103a through 103n

Figure 3:
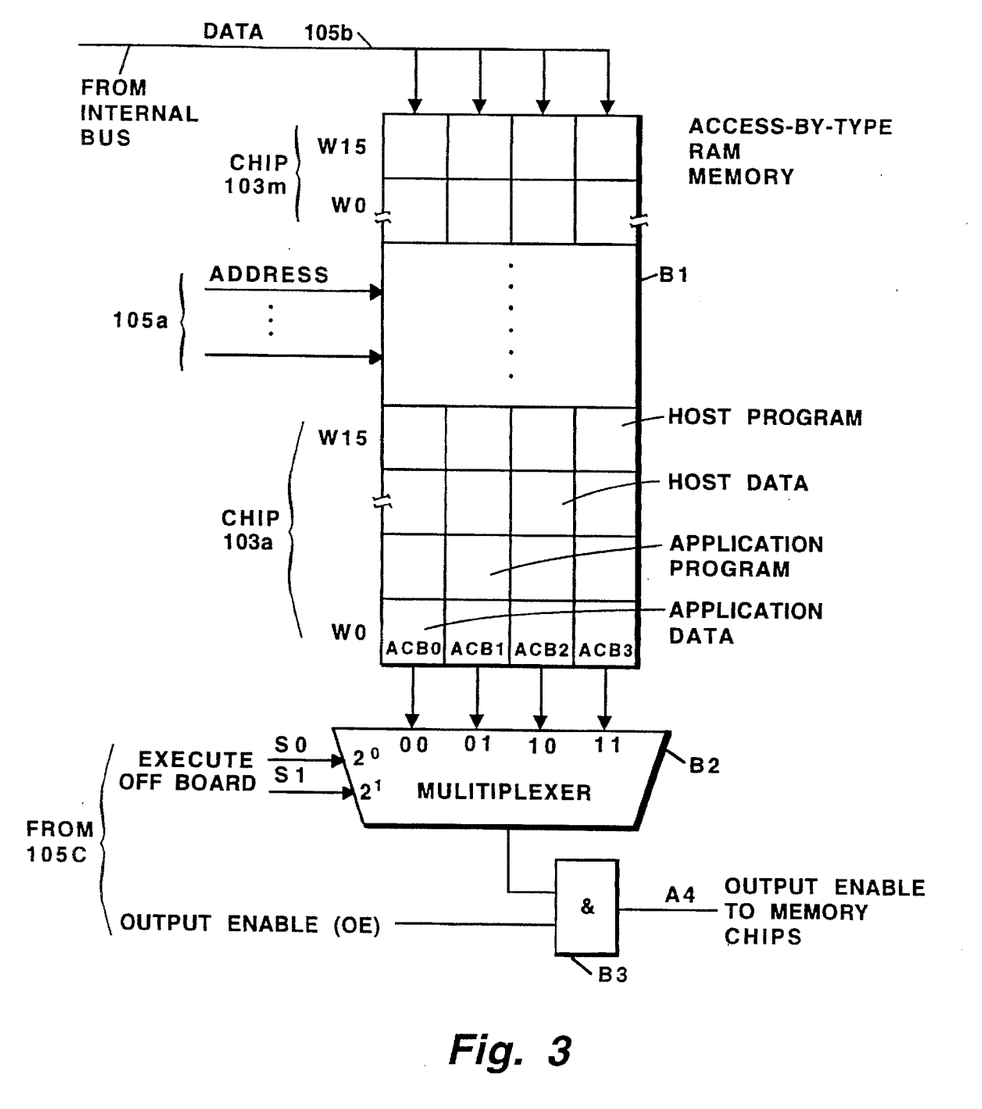
FIG. 3 shows in greater detail, the access by type memory of FIG. 1 constructed according to the teachings of the present invention.

FIG. 3 shows in block diagram form, flash memory 103a which is identical in construction to the remaining flash memories 103b through 103n. As shown, memory 103a includes two sections, a memory section 103M organized according to the present invention and a security logic section 103S containing the security access control circuits of the present invention.

Memory Section 103M

Figure 4:
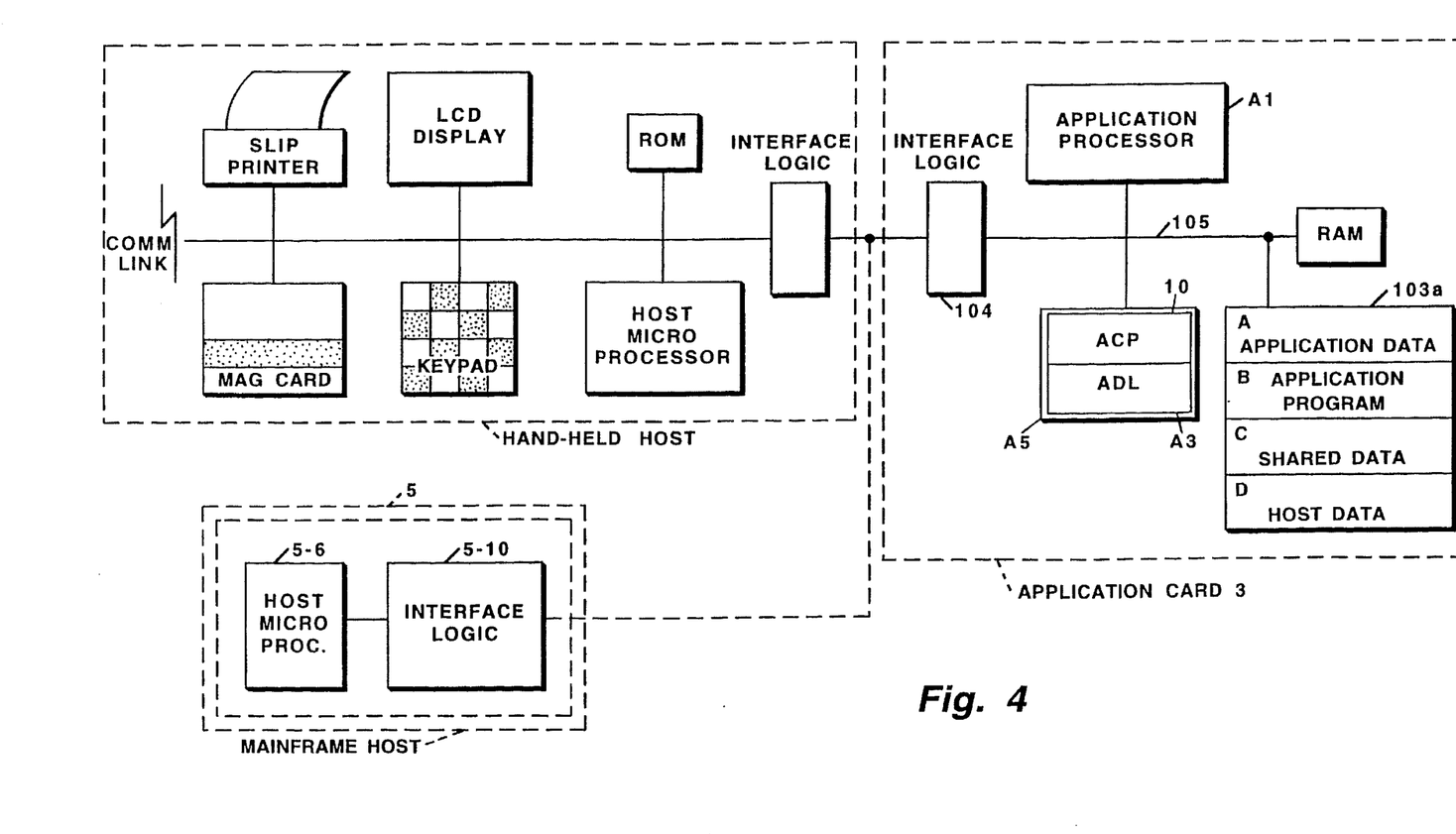
FIG. 4 is a system arrangement used to explained the operation of the application card of the present invention.

As seen from FIG. 3, section 103M includes a memory array 54 organized into sixteen blocks as shown in FIG. 4, a command register 50, input/output logic circuits 60, an address counter 56, a write state machine 61, an erase voltage system 62, an output multiplexer 53, a data register 55, an input buffer 51, an output buffer 52, and a status register 58, arranged as shown. The basic logic circuits of flash memory 103a, as discussed above, take the form of the type of circuits included in flash memories manufactured by Intel Corporation. Since such circuits can be considered conventional in design, they will only be described to the extent necessary. For further information regarding such circuits, reference may be made to the publication entitled, "Memory Products" Order Number 210830, published by Intel Corporation, dated 1992.

As shown in FIG. 3, the flash memory circuits receive a plurality of input address signals A0–A16, data signals D00–D07 and control signals consisting of chip enable, write enable, output enable, power down and erase/program power supply signals CE, WE, OE, PWD, and VPP respectively.

The CE, WE and OE signals are applied to command register 50 and I/O logic block 60 from host processor 5 via bus 102 and control bus 105b and dispersed to control the indicated logic blocks. More specifically, the output enable (OE) signal is applied as an input to output buffer 52 and in accordance with the present invention is provided by access discrimination logic A3 of FIG. 1. The PWD signal is also applied to command register 50 for enabling the flash memory to perform other operations such as to clear the volatile storage elements of section 103S as desired thereby enforcing user reauthentication when normal operation is again resumed.

Generally, the basic logic elements of section 103M operate in the following manner. Information is stored in memory array 54 via data bus 105a, input buffer 51 and data register 55 at an addressed location of one of the memory blocks specified by the address received by address counter 56 from address bus 105c. Information is read from a specified addressed location of a block of memory array 54 and is sent to host processor 5 via an output multiplexer 53, output buffer 52, data bus 105a and bus 102. A status register 58 is used for storing the status of the write state machine, the error suspend status, the erase status, the program status and the VPP status.

The write state machine 61 controls the block erase and program algorithms. The program/erase voltage system 62 is used for erasing blocks of the memory array 54 or the programming bytes of each block as a function of the voltage level of VPP.

Security Section 103S

As seen from FIG. 3, section 103S includes a security access control unit 30 and a volatile access control memory 43 interconnected as shown. The output of the access control memory 43 is applied as an enabling input to output buffer 52 during each memory read cycle when the contents of a byte location of any block of memory array 53 is being read out. That is, a read cycle may occur, however, the data read out is inhibited from passing through output buffer 52 in the absence of the appropriate block's access control memory gating signal.

More specifically, access control memory 43 includes sixteen individually addressable bit storage elements, an input address 4 to 16 bit decoder connected to the input of each storage element and a 1 to 16 output multiplexer circuit connected to the output of each storage element. As shown, four bits of address latch counter 56 corresponding to the block address applied to control memory 43 are decoded and used to select the appropriate storage element output which is applied as an enabling input to output buffer 52.

This section receives command control signals from command register 50 of section 103M. Special commands such as those described in the related patent applications are added to the sets of commands used by the flash memory for implementing data security. The standard flash memory commands take the form of the commands utilized by the Intel Corporation flash memories.

APPLICATION MICROPROCESSOR & HOST DEVICE

The application microprocessor A1 is contained in the application card and is programmed to perform all operation functions required for running a given application. In the preferred embodiment, the microprocessor may be constructed using an Intel 80286 microprocessor chip. The application microprocessor A1 also has a random access memory which is uses to perform certain intermediate calculations in running specific applications.

In addition to being used with the host processor 5 of FIG. 1, the application card 3 also operates in conjunction with the handheld point of sale host processor of FIG. 4. This host processor includes a number of peripheral devices such as a display, keypad ticket printer, credit card reader and a communications link which connect in common to an internal bus. The host microprocessor is a simple device which operates the peripheral devices but has minimum functionality of its own. For example, the microprocessor can be constructed using an Intel 8051 chip. It has its own read only memory (ROM) which contain start up and self test code only. Thus, the host device can be viewed as a "shell" with all of the significant functionality contained within the application card 3.

ACCESS DISCRIMINATION LOGIC UNIT

The access discrimination logic unit A3 as shown in FIG. 3 includes a random access memory B1 having n groups of locations corresponding to the number of flash memories. Each group contains 16 multibit or word locations, one for each block contained in the flash memory 103a. The number of bit positions of each word correspond to the number of different types of accesses required for the application being run. For example, in the application card of the preferred embodiment, as discussed above, there are four different types of accesses. These accesses are designated by bit positions 0 through 3 of each word. As indicated, bit positions 0 and 1 are used to control application microprocessor access to data and programs respectively. Bit positions 2 and 3 of each word are used to control host microprocessor access to data and programs respectively. When, any bit position is preset to a binary ONE state, this indicates that access is permitted. When a bit position is preset to a binary ZERO state, this indicates that access is not allowed.

As shown, the RAM array B1 connects to the data bus portion 105b of internal bus 105 for loading by an authorized microprocessor. It also connects to the address portion 105a of internal bus 105 which supplies the most significant bits of the memory address to act as an address to this array. The outputs of an addressed location are applied to the data inputs of a multiplexer B2. The selector inputs of the multiplexer B1 connect to the "Execute" and "Off Board" control lines of the control portion 105c of the internal bus 105 as shown. The output of the multiplexer B1 is applied as one input to an AND gate B3 which has another input connected to the output enable control line of the control portion 105c of internal bus 105. The AND gate B3 has its output connected to the output enable control line which is applied as an input to each of the memory chips 103a through 103n. In the preferred embodiment, the access discrimination logic A3 and access control microprocessor are contained microprocessor are contained on a single chip A5.

DESCRIPTION OF OPERATION

The operation of the application card of the present invention will now be described relative to a particular application illustrated in the system configuration of FIG. 4. There are a number of application cards, each of which is programmed for use in a restaurant environment. In the restaurant, the mainframe personal computer is used to all of the restaurant processing and can be constructed as the host personal computer 5 of FIG. 1. In addition to all of the normal facilities, the host personal computer 5 has, occupying a diskette slot, a device which accepts PCMCIA cards.

Each application card can be plugged into that interface as well as into any one of the number of hand held devices, such as the device of FIG. 4. As shown, each hand held device has a keypad, a small display and a credit card reader in addition to other required accessories. In the restaurant, there may be up to fifty such devices depending on the number of service personnel (e.g. waiters, bartenders, etc.).

Each morning before the restaurant opens for business, the data processing manager for the restaurant checks the group of hand held devices, one for every waiter, stored in a rack having their batteries recharged and without any cards. In another location, the manager locates a stack of application cards used the previous night. That is, the normal procedure is that when a waiter checks out, the waiter removes the card from the hand held device, places the device in the recharging rack and slips the card into a slot in a secure place in a door which can be only accessed by the manager.

Each application card has the capability of recognizing two hosts which means that the access control microprocessor 10 of each card has been programmed to recognize two PINs. One is the PIN of the computer system which only the manager and the mainframe personal computer 5 knows. The other is the PIN assigned by each waiter at the beginning of every shift chosen from a list of generic PINs provided by the manager.

The manager takes each application card and inserts it into the PCMCIA slot of the mainframe personal computer 5 which presents the higher level PIN. The most important information stored in each application card is a record of previous days transactions for a particular waiter for a given shift. This provides an audit trail which eliminates the need to process large amounts of paper receipts.

In the access discrimination logic unit A3, a differentiation is made relative to the types of accesses and types of data as indicated in FIG. 4 and in the following table.

In this situation, the transaction history data will later be made accessible to the mainframe personal computer 5 under the control of ACP10. While the hand held device is in the hands of the waiter, a closed transaction is stored within the application card and is accessible only to the application microprocessor A1 on the card. This prevents tampering with such data by any one.

When the application card is placed into the mainframe personal computer 5, it now presents a PIN or password which is used by ACP10 to verify that the host computer 5 has the correct permissions. Only when the appropriate permissions have been presented does ACP10 modify the content of the RAM array to provide the appropriate access (i.e., sets the third bits of each of the words W14 and W15 to binary ONES. When the access discrimination logic volatile RAM array is reloaded, the mainframe computer 5 is now allowed to read this data which in the hand held device was unavailable to it. The volatile RAM memory of the access discrimination logic A3 is set up by ACP10 so that the mainframe computer 5 has free access to all of the application card's information. The setup is under the control of the ACP for maintaining security.

The first thing the manager does is capture all of the previous night's transactions and store them in the mainframe computer 5 for later processing as appropriate (e.g. payment calculations, etc.). As previously indicated, when the mainframe computer 5 provides the correct PIN, it can cause the ACP 10 to set up the RAM B3 of the access discrimination logic unit A3 and the locks within the flash memories 103a through 103n to allow the mainframe computer 5 to read all of the data stored in such memories. After the data has been stored, those memory blocks are cleared/erased and rewritten for later use.

| | | | | | RAM CODING TABLE |
|---|---|---|---|---|---|
| W15 | 1 | 0 | 0 | 0 | ⎫ Application Microprocessor DATA-"A" |
| W14 | 1 | 0 | 0 | 0 | ⎭ (Day's Transaction History) |
| W13 | 0 | 1 | 0 | 0 | ⎫ |
| W12 | 0 | 1 | 0 | 0 | ⎪ |
| W11 | 0 | 1 | 0 | 0 | ⎪ |
| W10 | 0 | 1 | 0 | 0 | ⎬ Application Microprocessor PROGRAM-"B" |
| W9 | 0 | 1 | 0 | 0 | ⎪ (Application Code, Encryption for |
| W8 | 0 | 1 | 0 | 0 | ⎪ Credit Network) |
| W7 | 0 | 1 | 0 | 0 | ⎪ |
| W6 | 0 | 1 | 0 | 0 | ⎭ |
| W5 | 1 | 0 | 1 | 0 | ⎫ Host Microprocessor DATA-"C" (Today's ⎭ Menu, Price List, In-Process orders) |
| W4 | 0 | 0 | 0 | 1 | ⎫ |
| W3 | 0 | 0 | 0 | 1 | ⎪ |
| W2 | 0 | 0 | 0 | 1 | ⎬ Host microprocessor PROGRAM-"D" |
| W1 | 0 | 0 | 0 | 1 | ⎪ (Host I/O Drivers) |
| W0 | 0 | 0 | 0 | 1 | ⎭ |
| | AD | AP | HD | HP | | wherein AD=application data, AP=application program, HD=host data and HP=host program.

As indicated above, the daily transaction history data is shown as data which is accessible only to the application microprocessor A1 in the hand held device and not the hand held device itself for the reasons discussed herein. An area of memory 103a corresponding to two blocks has been allocated for storing this information. The first bits of each of the words W14 and W15 associated with the allocated blocks are set to binary ONES for designating read access only by the application microprocessor A1.

As indicated in FIG. 4 and the table, another area of memory 103a has been allocated to hold the correct menus and prices/specials and is rewritten each morning by the manager. This area corresponds to a single block which has word W5 associated with it. As indicated in the table, this information is made accessible to both the application microprocessor A1 and to the hand held host microprocessor of FIG. 4. Therefore, both the first bit and the third bit are set to binary ONES to allow such access.

The piece of data which would be not changed, is the program code for the application microprocessor itself. An important part of that code is the algorithms and encryptions that allow messages to be sent over the credit network via the communications link of FIG. 4 which includes the information describing how the hand held device is to access that network. That is, it includes the information which properly identifies the requester used for establishing that the transaction is a legitimate transaction to make a charge against a given account. This is highly secure information that is kept in the application card. If there is any change to this information such as a password change or update relative to identifying the restaurant as the source on the network, this information would also be written into the card by the manager as well and then protected so that it could not be accessed by restaurant employees. As shown in the table, an area of memory 103a corresponding to 8 blocks has been allocated for storing the program code for application microprocessor A3. The blocks have associated therewith, words W6 through W13, each of which has bit position 2 set to a binary ONE state designating "Execute" type access by application microprocessor A3.

Another type of information stored in memory 103a of the application card is the drivers for the devices on the hand held device. The area of memory corresponding to 5 blocks has been allocated to the storage of this information. The blocks have associated therewith, words W0 through W4, each of which has bit position 4 set to a binary ONE state for designating access only by the hand held host of FIG. 4.

If there was a bug in the credit card reader program, the update would be written into the flash memory at this time by the manager. By having the mainframe host processor 5 identify itself wherein different hosts can have different levels of privilege, the entire application card whose memory had been cleared can be updated so as to be ready for the next day's use and may be personalized for specific people on the service staff or the same information may be written into all of the cards.

The programmed application cards are placed in a stack and when an individual employee comes in to start work, that individual will take a hand held device from the charging rack and select a personalized card if so specified (e.g. bartenders—one type, waiters another type) which will be inserted into the handheld device. During the first log on, the individual will insert a generic PIN requiring the individual to identify that individual as the user which allows the person to select a PIN to use for that person's shift for added security.

If the card or device was discarded and later retrieved, the mainframe computer 5 would be able to obtain the data through the use of its overriding PIN. Of course, all of the application card data would be protected from being improperly accessed through the security unit of the application card as described in the cited related patent applications. That is, access could only be gained through the use of a master PIN which is only known by the mainframe computer 5.

One aspect of this security is that it allows the restaurant to operate without paper slips. Therefore, there is no need to maintain carbon copies thereby ensuring protection of customer credit card data. The printer in the hand held device would be used to print a single copy of a receipt for each customer who requests such a receipt. If the hand held device had a pen surface on it, this could be used to also capture the customer's signature.

After the above operations have been performed, the four areas of memory will have been properly setup pursuant to the table and the hand held device is now in the hands of the service personnel. As mentioned, the data area is reserved to the applications microprocessor A3 for storing closed transactions for the day which will be in a protected area (i.e., controlled by the coding of words W14 and W15) for both security reasons and so that they are properly preserved (e.g. not overridden by accident). This is an advantage of flash memory in that it eliminates the need for special battery backup circuits to preserve such information.

During the operation of the restaurant, service personnel enter closed transactions into the appropriate area of memory 103a. Writing takes place in a conventional manner under the control of appropriate write protection algorithms. That is, the application program code would cause the application processor A1 to write into the appropriate areas of memory. There is no software in the hand held host processor of FIG. 4 which has the ability to write into memory 103a. Since the method of writing does not form a part of the present invention, it is not described in further detail herein.

As indicated, there is another area indicated as the data area for the hand held host processor which is made freely accessible since it holds menu information as well as "in process" orders. In FIG. 4, there is a RAM shown as part of the application card. There is a normal trade off wherein for ease of implementation, interim or scratch calculations would be done in the RAM since it is more difficult to rewrite areas of the flash memory 103a. But it may be more desirable to write orders into memory 103a to protect against power loss. In this situation, the application processor A1 could tag a record indicating when an order was changed. This would be a matter of design choice.

Notwithstanding the above, there would be some type of information areas in the RAM that must be made accessible to both the application microprocessor A1 and the hand held host processor. The buffer areas that are used to refresh the screen on the hand held host processor would be made accessible to both devices. Here, there would be no truly secure information stored in there. Each transaction flows through the RAM but information such as credit card numbers would have no reason to be stored there. They would only be written into the secure area of the RAM.

As discussed above, there are two sections of programs in memory 103a. One section is the program area which is private to the application processor A1. This is basically the entire application program which is being protected partly because it includes the encryption algorithms and partly it represents a proprietary product of the device manufacturer such as unique programs which run the device (i.e., BIOS). If the application card were stolen and someone were to try to copy the program for reverse engineering purposes or to break some of its security features, they still would be unable to read that data even if they put the application card into the proper host device since they would still have to know the proper PINs including the very basic one which has to be first entered. This security is provided by the security unit which is subject of the related patent applications.

As indicated, the hand held host processor would not have access to this type of information for purposes of robustness. If there were bugs or errors in the code that branched off into the wrong area, it would be trapped out and not permitted access to such code.

The program code of the hand held host processor similarly is protected from access by the application microprocessor A1 for the purposes of robustness. Also, it allows the hand held device to be programmed more simply and reduces the amount of memory required. Thus, the present invention, by allowing two microprocessors to share memory, results in a more economical system implementation.

Figure 2:
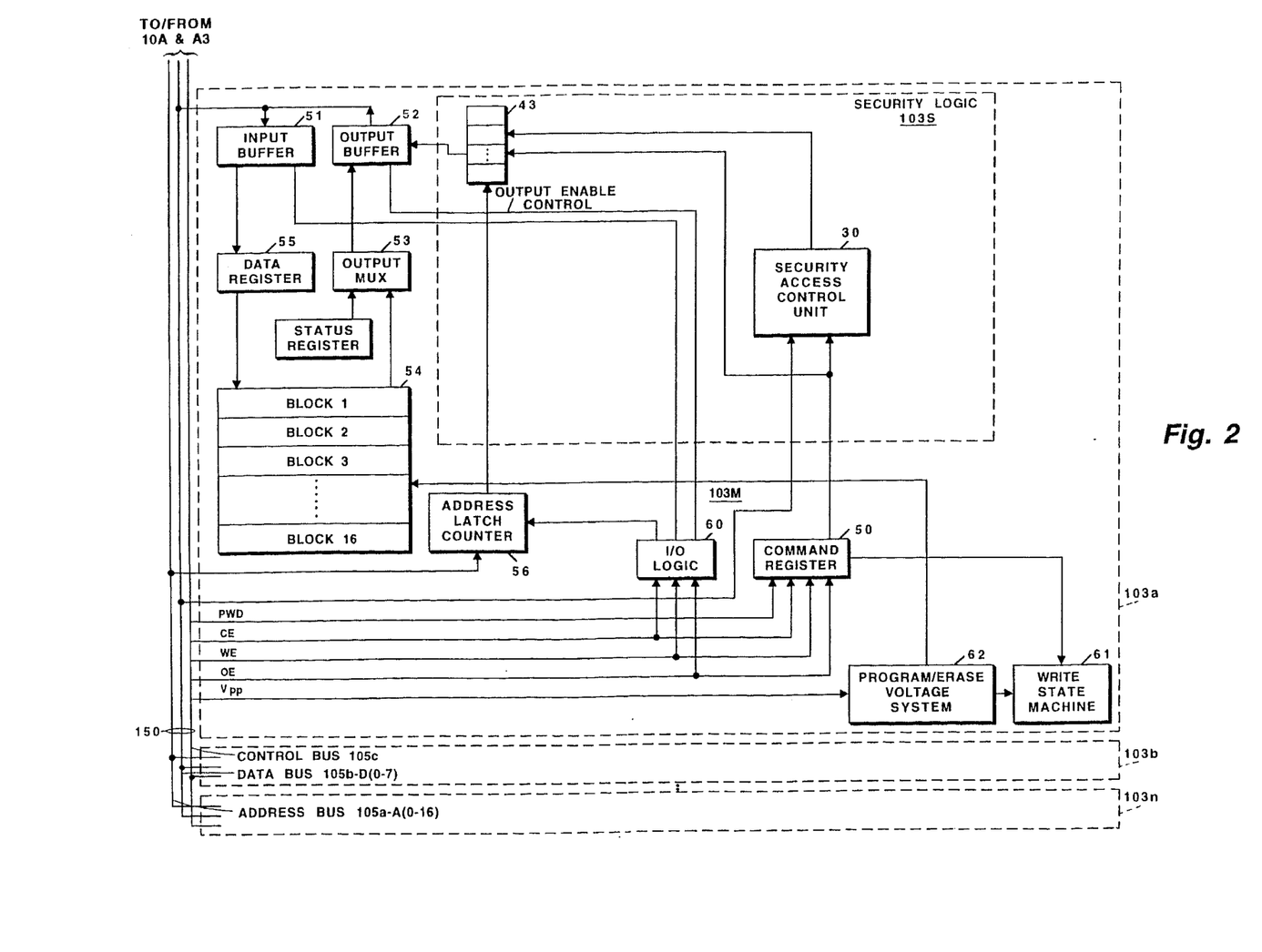
FIG. 2 shows in greater detail, the flash memory of FIG. 1.

During normal operations, the hand held host processor and application processor A1 of FIG. 4 generate memory addresses as required for accessing flash memory 103a. In the case of each access, the most significant bits of the memory address are applied to the address inputs of RAM B1 of FIG. 4 via the address bus 105a. This causes the read out of the multibit contents of the designated word location. The states of the "Execute" and "Off Board" lines applied as inputs to multiplexer B2 select the appropriate bit location. The state of this bit in turn controls output AND gate B3 to allow or disallow the transfer of the signal applied to the Output Enable control line to memory section 103m of FIG. 2. That is, read access is allowed or disallowed by preventing the output buffer 52 from applying the information read out from memory 54 to the data portion 105b of internal bus 105.

It will be appreciated that the performance requirements of the system and the access times of the access-by-type RAM array may be important in selecting the particular memory control bits to be used. Further, in the event that either the host microprocessors used or the external bus used does not support the "Execute Access" control function, these accesses may be treated as read accesses with some loss of security.

From the above, it is seen how the application card constructed according to the principles of the present invention provides a secure environment for both data and programs. It allows sharing of such information stored within a non-volatile memory between a plurality of microprocessors. Further, it enables application software to be packaged with its own application processor making such systems more economical to produce and use.

It will be appreciated that many changes may be made to the preferred embodiment of the present invention without departing from its teachings. For example, the present invention may be used in conjunction with a variety of applications. For example, the table given below illustrates further examples of memory 103a for sample applications.

| APPLICATION PROCESSOR | | HOST PROCESSOR | |
|---|---|---|---|
| DATA-"A" | PROGRAM-"B" | DATA-"C" | PROGRAM-"D" |
| A compilation of Financial Data | Analysis Program to perform specific analysis at a fee per transaction | General Workspace (valuable-slots are limited) | Interface Program with Application |
| Compressed maps (or other images) | Decompression software at a fee per transaction | Specific Map being viewed | Interface Program with Application |
| — | Any Application (e.g. a program which is not authorized to be copied such as "MS WORD") | Users Workspace | Interface Program with Application |

While in accordance with the provisions and statutes there has been illustrated and described the best form of the invention, certain changes may be made without departing form the spirit of the invention as set forth in the appended claims and that in some cases, certain features of the invention may be used to advantage without a corresponding use of other features.

What is claimed is:

1. An application card for use in conjunction with a host microprocessor coupled through a bus interface, said application card comprising:

interface logic circuit means operatively coupled to said bus interface, said interface logic circuit means being coupled to transmit and receive requests including address, data and control information to and from said host microprocessor;

an internal bus connected to said interface logic circuit means, said internal bus having address, data and control sections for transferring said requests including signals from said interface logic circuit means for each memory request specifying which microprocessor is making said each memory request and type of memory access being made;

an access control microprocessor connected to said internal bus, said microprocessor including
an addressable non-volatile memory for storing configuration information including non-volatile memory mapping information coded for executing a specific application;

at least one non-volatile addressable memory being connected to said internal bus in common with said access control microprocessor for receiving said address, data and control information, said non-volatile memory organized into a number of blocks for storing different access type information required for executing said specific application;

access discrimination logic unit coupled to said address, data and control sections of said internal bus and to said non-volatile memory, said access discrimination logic unit storing access by type information corresponding to said non-volatile memory mapping information for said number of blocks coded for specifying different types of memory access to be made to each block by each microprocessor involved in executing said specific application and said unit in response to a memory request, reading out said access by type information of one of said blocks designated by said address information of said memory request for enabling access to said block by said microprocessor making said memory request only as specified by said access by type information.

2. The application card of claim 1 wherein said access discrimination logic unit includes:

a random access memory (RAM) array having address, data and control inputs connected to said address, data and control sections of said internal bus respectively, and an output connected to said non-volatile memory, said RAM array having a plurality of storage locations corresponding in number to said number of blocks for storing said non-volatile memory mapping information, each storage location having a number of access control bit locations set to predetermined states as specified by said memory mapping information for designating types of memory accesses required by each microprocessor for executing said specific application in a secure environment, said RAM array in response to each memory request reading out memory mapping information from one of said plurality of storage locations designated by said address information and applying to said output, a control signal corresponding to one of said predetermined states from one of said access control bit locations specified by said signals from said interface logic circuit means for enabling said access.

3. The application card of claim 1 wherein said access control microprocessor and said access discrimination logic unit are contained on a single chip.

4. The application card of claim 2 wherein said access discrimination logic unit further includes:

multiplexer selector circuit means having data and control inputs and output circuit means, said data inputs being coupled to said RAM array for receiving said memory mapping information, said control inputs being coupled to said control section for receiving said signals from said interface logic circuit means and said output circuit means being coupled to said non-volatile memory, said multiplexer selector circuit means in response to said signals applied to said control inputs selecting one of said access control bit locations for applying said control signal to said output circuit means for enabling said access.

5. The application card of claim 4 wherein said output circuit means includes a logic circuit having at least first and second inputs and an output, said first input being connected to receive said control signal and second input being connected to a predetermined bus line of said control section and said output being connected to said non-volatile memory and wherein said signals consist of an off board signal designating which of said microprocessors generated said memory request and a bus access control signal for specifying said type of access.

6. The application card of claim 5 wherein said bus access control signal is an execute control signal coded for specifying that said microprocessor requesting access is allowed only to execute information in said block being accessed.

7. The application card of claim 5 wherein said bus access control signal is a read control signal coded for specifying that said microprocessor requesting access is allowed to read and execute information in said block being accessed.

8. The application card of claim 3 wherein a first group of said blocks of said non-volatile memory stores a first type of data pertaining to said application and wherein a first access control bit location of each storage location associated with a different one of said first group of said blocks is set to a first state for enabling access to storage locations in said first group of said blocks by an application microprocessor programmed to perform operations for executing said specific application and a second access control bit location of said each storage location being set to a second state for inhibiting access to storage locations in said first group of blocks by a host microprocessor which is not authorized to access said data.

9. The application card of claim 8 wherein said first state and second state corresponds to a binary ONE and a binary ZERO, respectively.

10. The application card of claim 8 wherein a second group of said blocks of said non-volatile memory stores a second type of data pertaining to said application and wherein said first access control bit location of each storage location associated with a different one of said second group of said blocks is set to said second state for inhibiting access to storage locations in said second group of blocks by said application microprocessor and said second access control bit location of each storage location being set to said first state for enabling access to storage locations in said second group of locations by said host microprocessor.

11. The application card of claim 10 wherein a third group of said blocks of said non-volatile memory stores a first type of program information utilized by said application microprocessor in executing operations pertaining to said application and wherein a third access control bit location of each storage location associated with a different one of said third group of said blocks is set to said first state for enabling access to storage locations in said first group of said blocks by an application microprocessors programmed to perform operations for executing said specific application and a fourth access control bit location of said each storage location being set to said second state for inhibiting access to storage locations in said third group of blocks by a host microprocessor which is not authorized to access said program information for maintaining security.

12. The application card of claim 11 wherein a fourth group of said blocks of said non-volatile memory stores a second type of program information utilized by said host microprocessor in executing operations pertaining to said application and wherein said third access control bit location of each storage location associated with a different one of said fourth group of said blocks is set to said second state for inhibiting access to storage locations in said fourth group of blocks by said application microprocessor for maintaining system integrity and said fourth access control bit location of each storage location being set to said first state for enabling access to storage locations in said fourth group of locations by said host microprocessor.

13. The application card of claim 12 wherein said first, second, third and fourth groups of blocks contain different numbers of blocks.

14. The application card of claim 1 wherein said card further includes an application microprocessor programmed for performing operations for executing said specific application, said application microprocessor being coupled to said address, data and control sections of said internal bus and for generating signals specifying said type of memory access being made.

15. The application card of claim 1 wherein said access control microprocessor in response to a power on signal loads said access discrimination logic unit with said non-volatile memory mapping information which is to be used in executing said specific application.

16. The application card of claim 1 wherein during execution of said specific application, said access control microprocessor in response to each request to change said non-volatile memory mapping information stored in said access discrimination logic unit received from said host microprocessor only modifies said non-volatile memory mapping information after a successful authentication operation is performed by said host microprocessor.

17. The application card of claim 16 wherein said access control microprocessor non-volatile memory configuration information further includes a number of passwords used by said access control microprocessor in performing said authentication operation.

18. An application card for use in conjunction with a host microprocessor coupled through a bus interface, said application card comprising:

interface logic circuit means operatively coupled to said bus interface, said interface logic circuit means being coupled to transmit and receive requests including address, data and control information to and from said host microprocessor;

an internal bus connected to said interface logic circuit means, said internal bus having address, data and control sections for transferring said requests including signals from said interface logic circuit means for each memory request specifying which microprocessor is making said each memory request and type of memory access being made;

an access control microprocessor connected to said internal bus, said microprocessor including
    an addressable non-volatile memory for storing configuration information including non-volatile memory mapping information coded for executing a specific application;

an application microprocessor programmed for performing operations for executing said specific application, said application microprocessor being connected to said address, data and control sections of said internal bus and for generating signals specifying said type of memory access being made;

at least one non-volatile addressable memory being connected to said internal bus in common with said microprocessor for receiving said address, data and control information, said non-volatile memory organized into a number of blocks, each having a plurality of storage locations for storing different access type information required for executing said application, said number of blocks having a number of groups of blocks, each group for storing different data and program information utilized by said host and application microprocessors in executing said specific application; and, an access discrimination logic unit coupled to said address, data and control sections of said internal bus and to said non-volatile memory, said access discrimination logic unit storing access by type information corresponding to said non-volatile memory mapping information for said number of groups of said number of blocks coded for specifying different types of memory access to be made to either said data or program information stored in each block by said application and host microprocessors in executing said application and said unit in response to a memory request, reading out said access by type information of one of said blocks designated by said address information of said memory request for enabling access to information stored in said block by said microprocessor making said memory request only as specified by said access by type information so as to provide a secure environment.

19. The application card of claim 1 wherein said access discrimination logic unit includes:

a random access memory (RAM) array having address, data and control inputs connected to said address, data and control sections of said internal bus respectively, and an output connected to said non-volatile memory, said RAM array having a plurality of storage locations corresponding in number to said number of blocks for storing said non-volatile memory mapping information, each storage location having a number of access control bit locations corresponding to said number of groups within said number of blocks, said access control bit locations being set to predetermined states as specified by said memory mapping information for designating types of memory accesses required by said application and host microprocessors for executing said specific application, said RAM array in response to each memory request reading out memory mapping information from one of said plurality of storage locations designated by said address information and applying to said output, a control signal representative of one of said predetermined states from one of said access control bit locations specified by said signals from said interface logic circuit means designating either said application or host microprocessor as requesting memory access and type of memory access for enabling said access only as specified by said one of said predetermined states.

* * * * *